US006522095B2

(12) United States Patent
Kachouh

(10) Patent No.: US 6,522,095 B2
(45) Date of Patent: Feb. 18, 2003

(54) MOTOR VEHICLE DOOR LOCK

(75) Inventor: Checrallah Kachouh, Dortmund (DE)

(73) Assignee: Brose Schliesssysteme GmbH, Coburg (DE)

(*) Notice: Subject to any disclaimer, the term of this patent is extended or adjusted under 35 U.S.C. 154(b) by 0 days.

(21) Appl. No.: 09/794,242

(22) Filed: Feb. 28, 2001

(65) Prior Publication Data

US 2001/0030426 A1 Oct. 18, 2001

(30) Foreign Application Priority Data

Feb. 29, 2000 (DE) ........................................ 100 09 391

(51) Int. Cl.7 .................................................. H02P 7/00

(52) U.S. Cl. ....................... 318/445; 318/282; 318/430; 318/432; 318/434; 318/466; 318/468; 318/10; 292/3; 292/66; 292/169; 292/341.16

(58) Field of Search ................................ 318/430, 432, 318/434, 280, 10, 445, 282, 466, 468; 292/201, 341.16, 3, 66, 169

(56) References Cited

U.S. PATENT DOCUMENTS

| | | | | |
|---|---|---|---|---|
| 4,569,544 A | * | 2/1986 | Escaravage | 292/216 |
| 5,409,277 A | * | 4/1995 | Rogers, Jr. et al. | 292/336.3 |
| 5,938,252 A | * | 8/1999 | Uemura et al. | 292/201 |
| 6,131,967 A | * | 10/2000 | Kondo et al. | 292/201 |
| 6,164,015 A | * | 12/2000 | Kawanobe et al. | 49/360 |

FOREIGN PATENT DOCUMENTS

| | | | | |
|---|---|---|---|---|
| DE | 197 47 211 A1 | | 5/1999 | |
| EP | 1130198 A2 | * | 2/2001 | E05B/17/22 |
| JP | 08-332841 | * | 12/1986 | B05J/5/00 |
| JP | 10-184141 | * | 7/1998 | E05B/65/20 |
| JP | 10-273984 | * | 10/1998 | E05B/49/00 |

* cited by examiner

*Primary Examiner*—Marlon T. Fletcher
*Assistant Examiner*—Tyrone Smith
(74) *Attorney, Agent, or Firm*—Nixon Peabody LLP; David S. Safran

(57) ABSTRACT

A motor vehicle door lock including a diode for operating an electric motor drive in one direction of drive rotation. To minimize the electric motor turning back against the direction of drive rotation in the off state, the diode is connected in parallel to the electric motor drive which provides essentially for short circuiting of the electric motor drive when it turns back. In this way, rebound of the electric motor drive is prevented or reduced.

2 Claims, 1 Drawing Sheet

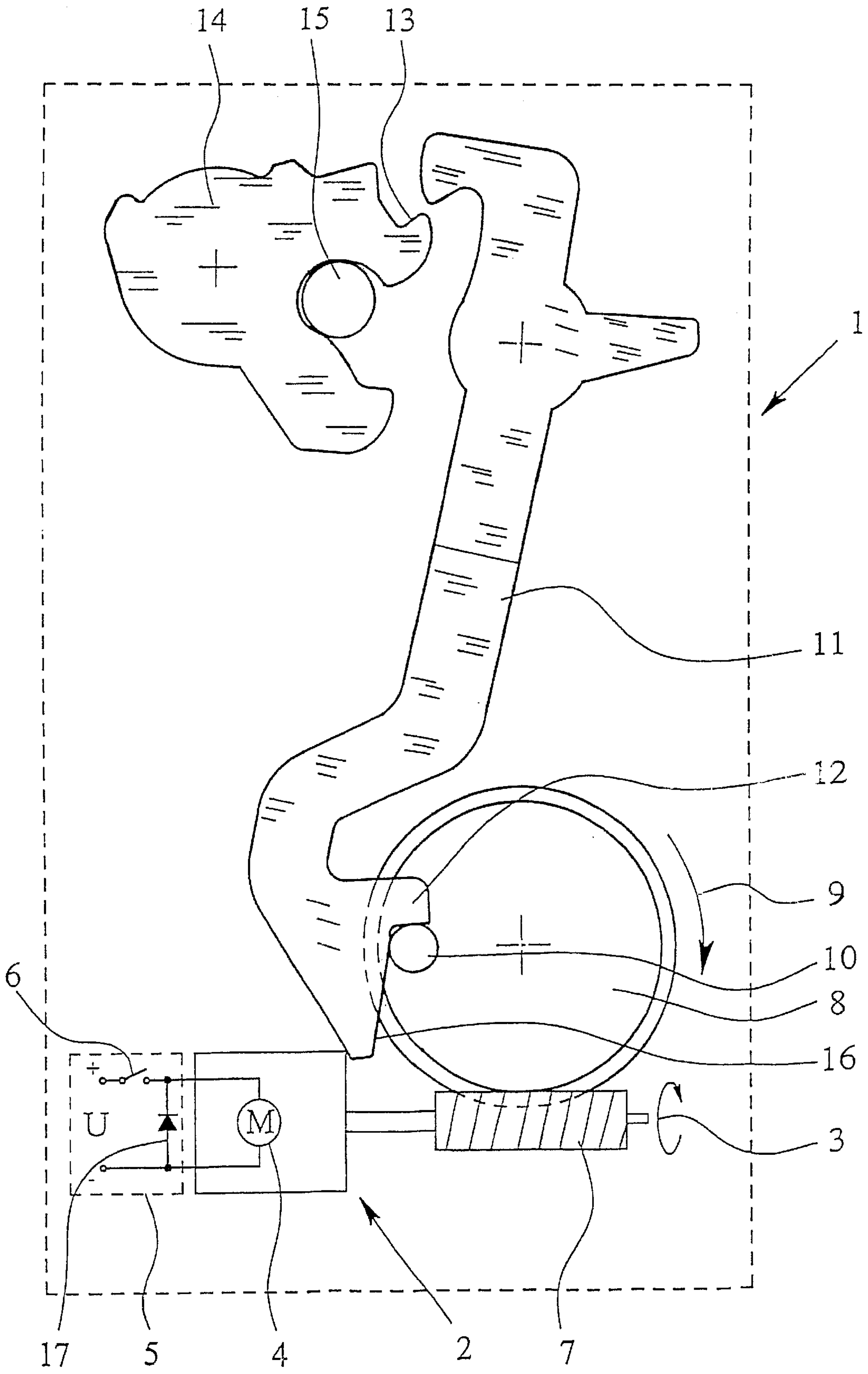
14
15
13
1
11
12
9
10
8
16
6
U
M
3
17
5
4
2
7

MOTOR VEHICLE DOOR LOCK

BACKGROUND OF THE INVENTION

1. Field of the Invention

The present invention relates to a motor vehicle door lock such as a side door lock, a rear door lock, a rear hatch lock, a hood lock or the like, and the use of a diode in the motor vehicle door lock.

2. Description of the Related Art

Published German Patent Application DE 197 97 211 A1 discloses a motor vehicle door lock which has an electric motor for driving the actuating element. However, since the electric motor can only be operated in one direction of drive rotation, the poling of the drive DC voltage is not changed. Moreover, the motor vehicle door lock has completely self-locking gearing in the form of a worm gear which can be driven by the electric motor and which acts on the actuating element which is made as a worm wheel. The actuating element is provided with a driving journal which can act on the detent pawl of the motor vehicle door lock for pivoting the detent pawl. The detent pawl has an abutment stop against which the driving journal of the actuating element runs in the pivoting position of the detent pawl so that further rotary motion of the actuating element, and thus, rotary motion of the electric motor is blocked in the direction of drive rotation temporarily as long as the detent pawl is in this pivoting position.

In the aforementioned blocking there is the danger that the actuating element again moves back against the direction of motion which is effected when the electric motor turns in the direction of drive rotation, as is explained in German Patent Application DE 197 47 211 A1. The aforementioned shifting motion of the actuating element when blocked by an abutment stop is undesirable and is to be avoided. In this respect German Patent Application DE 197 47 211 A1 calls for mechanical blocking of the actuating element for prevention of reversed motion, however, mechanical blocking is complex and sensitive.

SUMMARY OF THE INVENTION

An object of the invention is to provide a motor vehicle door lock including the use of a diode in the motor vehicle door lock so that the backward motion reversal of the actuating element which is driven by the electric motor can be minimized easily, economically and less susceptibly.

The object is achieved by connecting a diode parallel to the electric motor which, when the electric motor is turned off, minimizes the reversal of the electric motor by means of the voltages which occur when the electric motor is reversed being more or less short circuited, or at least greatly reduced via the diode, by which very strong braking of the electric motor results. Consequently, in this way the undesirable backward motion of the actuating element which is connected directly to the electric motor or especially indirectly via gearing is minimized.

An advantageous result in the present invention is that a mechanism for blocking the backward or reversing motion is not necessary. A diode is available very economically. Accordingly a simple, economical approach arises. Another advantageous result is that a diode is not subject to wear. Consequently, the susceptibility or failure probability is greatly improved relative to the prior art. This is a major advantage especially with respect to the required long life in motor vehicle components. Another advantage of avoiding mechanical blocking of the actuating element against unwanted backward or reversing motion is the reduction of noise, since mechanical systems in operation always produce noise. Moreover, the diode can be used for interference suppression since voltage peaks can be diminished via the diode when the electric motor is turned off. Accordingly, an electronic component for motor interference suppression which is generally otherwise necessary can be eliminated by the use of a diode as claimed in the invention.

Other details, features, objectives and advantages of this invention are detailed below using the drawings of one preferred embodiment.

BRIEF DESCRIPTION OF THE DRAWING

The sole Figure shows a schematic of a motor vehicle door lock in accordance with the present invention.

DETAILED DESCRIPTION OF THE PREFERRED EMBODIMENTS

And now to the drawings, in which FIG. 1 shows schematically a motor vehicle door lock 1 with an electric motor drive 2 in accordance with the present invention. The drive 2 has an electric motor 4 (shown schematically), which can be operated solely in one direction 3 of drive rotation, and is made as a direct current motor which can be supplied if necessary with a matched DC drive voltage U by a control means 5. The control means 5 can, therefore, turn the electric motor on and off, as is shown schematically by switches 6.

The electric motor 4 is connected to a worm gear 7 which engages an actuating element 8 made as a worm wheel so that rotation of the electric motor 4 in the direction 3 of drive rotation causes rotation of the actuating element 8 as shown by arrow 9. The worm gear 7 is made not completely self-locking, at least to the extent turning of the actuating element 8 back against the direction 9 of rotation is concerned. The actuating element 8 includes a journal-like function element 10 which projects in the axial direction of the actuating element 8 and which acts upon the locking element of the motor vehicle door lock 1, the locking element serving as a detent pawl 11. Accordingly, the function element 10 can also be used as the actuating element for the purposes of this invention.

FIG. 1 shows the motor vehicle door lock 1 in the operating position in which an abutment stop 12 of the detent pawl 11 blocks continued motion of the function element 10 in the direction of motion 9, and thus, of the actuating element 8, since the abutment stop 12 is located in the path of motion of the function element 10. In this operating or pivoting position, the detent pawl 11 releases a main catch 13 of an assigned lock latch 14 which engages a pin-shaped lock bracket 15. The actuating element 8 or the function element 10 causes pivoting of the detent pawl 11 into the operating position which is shown such that the function element 10 engages a control edge 16 of the detent pawl 11 and finally being blocked into the operating position by striking the abutment stop 12 in its motion as shown by the arrow 9.

When the actuating element 8 or the function element 10 is blocked by the abutment stop 12, the electric motor 4 is necessarily braked, and generally, only then is the electric motor 4 turned off. In other embodiments, the electric motor 4 is already turned off before blocking so that over-rotation of the drive 2 caused by the moment of inertia results in contact of the function element 10 with the abutment stop 12. In the first case, the control means 5 acquires the current rise which is associated with blocking, and thereupon, shuts off the electric motor 4. This providers an advantage since a position sensor or the like is not necessary. In a second embodiment, the prior shutoff by the control means 5 takes place conventionally depending upon the signal which indicates the position of the actuating element 8 or of the function element 10 so that a position sensor or the like is necessary.

In order to minimize excess rebound or backward rotational motion of the actuating element 8 or the function element 10 from the blocking position or contact with the abutment stop 12 against the rotation relayed when the electric motor 4 is operating, a diode 17, or a corresponding electric component which has comparable electric properties, is connected in parallel to the electric motor 4. The diode 17 has a reverse voltage which is above the power supply DC voltage U and is applied to the electric motor 4. The diode 17 is oriented or connected such that when the electric motor 4 is turned on, thus, when the drive DC voltage U is applied or the switch 6 is closed, the drive DC voltage U is not short circuited by the diode 17, but is on the electric motor 4. When the electric motor 4 is turned off, however, the diode 17 causes the rotation of the electric motor 4 against the direction of drive rotation 3 (reversal) to be minimized. Reversal of the electric motor 4 can be caused especially in the blocked position by the partially inevitable and partially desirable elasticities of the drive line beginning from the electric motor 4 via the gearing 7, the actuating element 8 and the function element 10 as far as the abutment stop 12 or the detent pawl 11 when the actuating element 8 or the function element 10 is blocked by the abutment stop 12. The diode 17, when the electric motor 10 is reversed, causes minimization of the reversal by a type of plug braking, since when the electric motor 4 is reversed a voltage is produced which is poled opposite to the poling of the DC drive voltage U, and which is short circuited or decreased via the diode 17 which is connected in the forward direction for these voltages. Accordingly, this leads to relatively strong minimization of the reversal of the electric motor 4 so that mechanical blocking of the actuating element 8 or the function element 10 or some other part of the drive line or of the drive 2 is not necessary.

Another advantage of the diode 17 is that it is used in addition for interference suppression of the electric motor 4 since the voltage peaks which occur when the electric motor 4 is turned off can be reduced. Accordingly, an otherwise conventionally necessary electronic component for suppression of interference of the electric motor 4 can be omitted. In FIG. 1, while the diode 17 is shown as being integrated into the control means 5, this is not necessary. For example, the diode 17 can also be located directly on the electric motor 4, or, subsequently for constructions already existing, can be located between the control means 5 and the electric motor 4.

The detent pawl 11 can continue to be pivoted clockwise by the lock latch 14 which is being pivoted, specifically, by its arm which overshoots and which bears the preliminary catch, so that the abutment stop 12 can be moved entirely out of the path of motion of the actuating element 8 or of the function element 10 and the actuating element 8 or the function element 10 when the electric motor 4 is turned on can further continue its motion along its peripheral path of motion, here in the direction 9 of rotation. It goes without saying that the actuating element 8 with its function element 10 can, if necessary, also assume other rotary positions at rest with the electric motor 4 turned off and can also interact with other levers, elements and other parts of the locking mechanism of the motor vehicle door lock 1.

In the embodiment shown, the drive 2 acts on the detent pawl 11 of the motor vehicle door lock 1 so that the motor vehicle door lock 1 can be opened by electric motor. It is, therefore, a so-called electric lock here. But this is not absolutely necessary. Of course, the drive 2 can generally interact with any part of the lock mechanism of the motor vehicle door lock 1, for example, with a blocking lever (not shown) and which can be used solely for a central interlock function. In addition, the above explained approach in accordance with the present invention is not limited to a motor vehicle door lock 1.

I claim:

1. A motor vehicle door lock comprising:

an electric motor rotatably uni-directionally driven by a DC drive voltage;

an actuating element rotatably driven by said electric motor via a gear which is not completely self-locked in a direction opposite the direction of rotation of said gear;

an abutment stop for temporarily blocking the rotation motion of said actuating element, said electric motor being turned off when said actuating element is blocked by said abutment stop; and a diode with a blocking voltage which exceeds the DC drive voltage;

wherein said diode is electrically connected in parallel to said electric motor in a forward biased orientation which blocks the DC drive voltage so that reversal rotation of said electric motor against the direction of drive rotation in an off state when said actuating element is blocked by said abutment stop, is minimized by the low-resistance connection provided by said forward biased diode.

2. A process of using a diode in a motor vehicle door lock:

providing an electric motor uni-directionally driven by a DC drive voltage, providing an actuating element rotatably driven by said electric motor via a gear which is not completely self-locked in a direction opposite the direction of rotation of said gear;

temporarily blocking the rotation motion of said actuating element;

turning off said electric motor when said actuating element is blocked;

providing a diode with a blocking voltage which exceeds said DC drive voltage, electrically connecting said diode in parallel to said electric motor in a forward biased orientation which blocks said DC drive voltage such that reversal rotation of said electric motor against a direction of drive rotation in an off state when said actuating element is blocked by said abutment stop, is minimized by the low-resistance connection provided by said forward biased diode.

* * * * *